United States Patent Office 3,405,184
Patented Oct. 8, 1968

3,405,184
PROCESS FOR PREPARING HALOGENATED PHENOXYPHENOLS
Alexander H. Widiger, Jr., and Richard L. Johnson, Midland, Mich., assignors to The Dow Chemical Company, Midland, Mich., a corporation of Delaware
No Drawing. Filed Dec. 13, 1965, Ser. No. 513,581
10 Claims. (Cl. 260—613)

ABSTRACT OF THE DISCLOSURE

Halogenated phenols wherein the halogen substituents are chlorine or bromine react at a temperature of 150° C. or above in the presence of a metal catalyst to form a halogenated phenoxyphenol by condensation of two phenol molecules and elimination of hydrogen halide. Suitable catalysts are halides of iron, magnesium, antimony, aluminum, copper, and zinc or substances converted thereto by reaction with a halophenol.

---

This invention relates to the preparation of substituted diphenyl ethers by the condensation of halophenols at elevated temperatures.

The condensation reaction of the invention may be represented by the following equation (I)

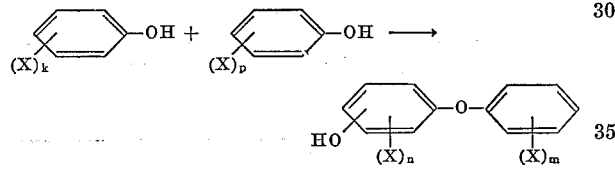

wherein each X independently represents a middle halogen atom (Cl, Br), $p$, $k$ and $m$ are each integers of from 1 to 5 and $n$ is an integer of from 0 to 4, the sum of $n$ plus $m$ equals $k+p-1$, and each unsubstituted carbon atom in the indicated formulae is bonded to a hydrogen atom.

The condensation reaction (I) is conducted in the presence of a Friedel-Crafts catalyst at temperatures of from about 150° C. up to the decomposition temperature of the diphenyl ether products. The reaction may be carried out at any convenient pressure (from subatmospheric up to several hundred atmospheres). The reaction is ordinarily carried out under autogenous pressure. A typical temperature range for the reaction is from about 150° to 350° C., and preferably 150° to 300° C. Any Friedel-Crafts catalyst which does not react with the diphenyl ether products may be employed. Examples of suitable catalysts include $FeCl_3$, $FeBr_3$, $FeCl_2$, $FeBr_2$, $CuCl_2$, $CuCl$, $MgCl_2$, $SbCl_3$, $SbBr_3$, $SbCl_5$, $SbBr_5$, $AlCl_3$ and $ZnCl_2$. In addition, the oxides of metals which are converted to the metal halide by reaction with halophenols at elevated temperature may be employed. For example, cupric oxide, iron oxide, iron and/or copper may be used as catalysts for the reaction of the present invention. Only a catalytic amount of these inorganic Friedel-Crafts materials is required. Generally, an amount of up to about 25 percent by weight of catalyst (based upon the total weight of the reaction mixture) is sufficient. Amounts of from about .01 to 5 percent by weight are typically employed.

The general reaction (I) may be further illustrated by the following reactions which are carried out at temperatures of about 150° C. or more using the indicated Friedel-Crafts catalyst.

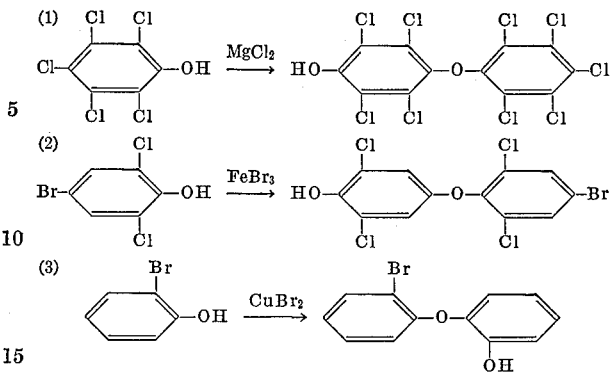

In the above reactions, all unsubstituted ring carbon atoms are bonded to hydrogen atoms. Other products may be formed by a suitable choice of reactants and catalysts (or mixtures of catalysts) according to the general reaction (I). For example, mixtures of different halo-substituted phenols may be condensed and the reaction products separated by a conventional means (e.g., chromatographic methods) according to the following reactions:

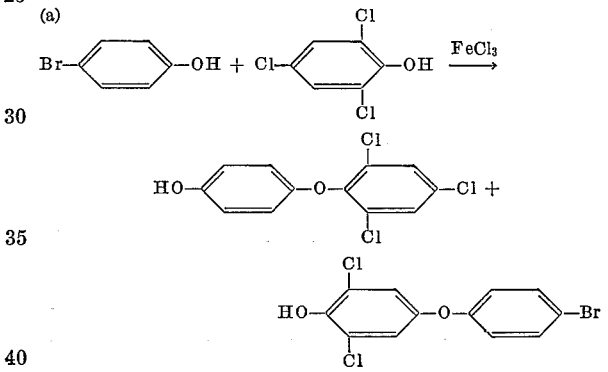

Other isomers may also be produced by the reaction.

Reaction times may be varied widely, depending upon the type of process employed. For a continuous process which recycles the reactants, a reaction time of short duration (e.g., a few seconds up to 1–2 minutes) may be used. Batch operation usually is carried out with reaction times of 1–2 hours up to several days. Any convenient time may be used if only small amounts of product are desired. The reactants may be heated with catalysts for time periods of 24 hours or more prior to separation of the products. The products are conveniently separated by vapor phase chromatography or other conventional separation techniques.

The halo-substituted diphenyl ether compounds of the invention are useful as bactericides and biocides. For example, the compounds inhibit the growth of bacteria such as *E. coli* organisms upon contact. The compounds may be applied to contaminated materials directly or in diluted form with a suitable carrier or adjuvant. Amounts of up to 15 percent by weight in an aqueous solution or dispersion are effective.

The following examples are submitted for the purpose of illustration only and are not to be construed as limiting the scope of the invention in any way.

Examples I–VI.—General method

A weighted amount (300 grams) of halogenated phenol was placed in a 500 milliliter glass flask connected to a condenser and equipped with a heat source and temperature control. The catalyst was added to the flask and the mixture heated for a time sufficient to at least partially complete the reaction. Each reaction mixture was then subjected to distillation under reduced pressure after removal of the catalyst from the reaction mixture. The final reaction products were then separated by vapor phase chromatography and analyzed. The results are summarized in Table 1.

2. The method of claim 1 wherein the catalyst is a metal chloride.
3. The method of claim 1 wherein the catalyst is a metal bromide.
4. The method of claim 1 wherein at least one halogenated phenol is 2,4,5-trichlorophenol.
5. The method of claim 1 wherein at least one halogenated phenol is para-chlorophenol.
6. The method of claim 1 wherein at least one halogenated phenol is ortho-chlorophenol.
7. The method of claim 1 wherein at least one halogenated phenol is 2,4-dichlorophenol.
8. The method of claim 1 wherein at least one halogenated phenol is para-bromophenol.
9. The method of claim 1 wherein the halogenated phenol component is a mixture of para-bromophenol and 2,4,6-trichlorophenol.
10. The method of claim 1 wherein the halogenated

TABLE 1

| Example Number | Reactant | Halophenoxyphenol separated from reaction product | Catalyst | Reaction time (hours) | Temp. (° C.) |
|---|---|---|---|---|---|
| I | 2,4,5-trichlorophenol (Cl, Cl, Cl substituted phenol) | 4-(2,4,5-trichlorophenoxy)-2,5-dichlorophenol | FeCl$_3$ | (a) 72<br>(b) 4 | (a) 170.<br>(b) 210. |
| II | p-Chlorophenol | Cl–⟨ ⟩–O–⟨ ⟩–OH | (a) MgCl$_2$*<br>(b) ZnCl$_2$<br>(c) SbCl$_3$<br>(d) FeCl$_3$<br>(e) CuO+Cu<br>(f) Fe | (a) 72<br>(b) 72<br>(c) 72<br>(d) 48<br>(e) 72<br>(f) 48 | (a) 220.<br>(b) 220.<br>(c) 220.<br>(d) 218.<br>(e) 205.<br>(f) 218. |
| III | o-Chlorophenol | Cl, OH substituted diphenyl ether | CuCl$_2$ | 72 | 175–180. |
| IV | 2,4-dichlorophenol | Cl, Cl, Cl substituted diphenyl ether –OH | (a) ZnCl$_2$*<br>(b) CuO+Cu | (a) 72<br>(b) 72 | (a) 205.<br>(b) 205. |
| V | Pentachlorophenol | Cl, Cl, Cl, Cl substituted diphenyl ether –OH with Cl, Cl, Cl, Cl | Fe–FeCl$_3$ | 72 | 190. |
| VI | p-Bromophenol | Br–⟨ ⟩–O–⟨ ⟩–OH | Fe–FeBr$_3$ | 23 | 166–195. |

*A series of different catalysts were employed to compare the results obtained using the same starting materials.

We claim as our invention:

1. A method for making a halogenated phenoxyphenol which comprises heating at a temperature of about 150° C.–350° C. a mixture of at least one halogenated phenol of the formula

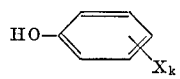

wherein $k$ is an integer from 1 to 5 and each X is chlorine or bromine with a catalyst which is a bromide or chloride of iron, copper, magnesium, antimony, aluminum, or zinc.

phenol is pentachlorophenol, the catalyst is an iron chloride, and the halogenated phenoxyphenol product is 4-(pentachlorophenoxy)-2,3,5,6-tetrachlorophenol.

References Cited

UNITED STATES PATENTS

| 1,932,595 | 10/1933 | Muth et al. | 260—613 |
| 3,220,979 | 11/1965 | McNelis | 260—613 XR |
| 3,306,875 | 2/1967 | Hay | 260—613 XR |

BERNARD HELFIN, *Primary Examiner.*